Feb. 9, 1954  W. R. COCKRELL  2,668,744
LEVELING BRACKET
Filed Aug. 27, 1952
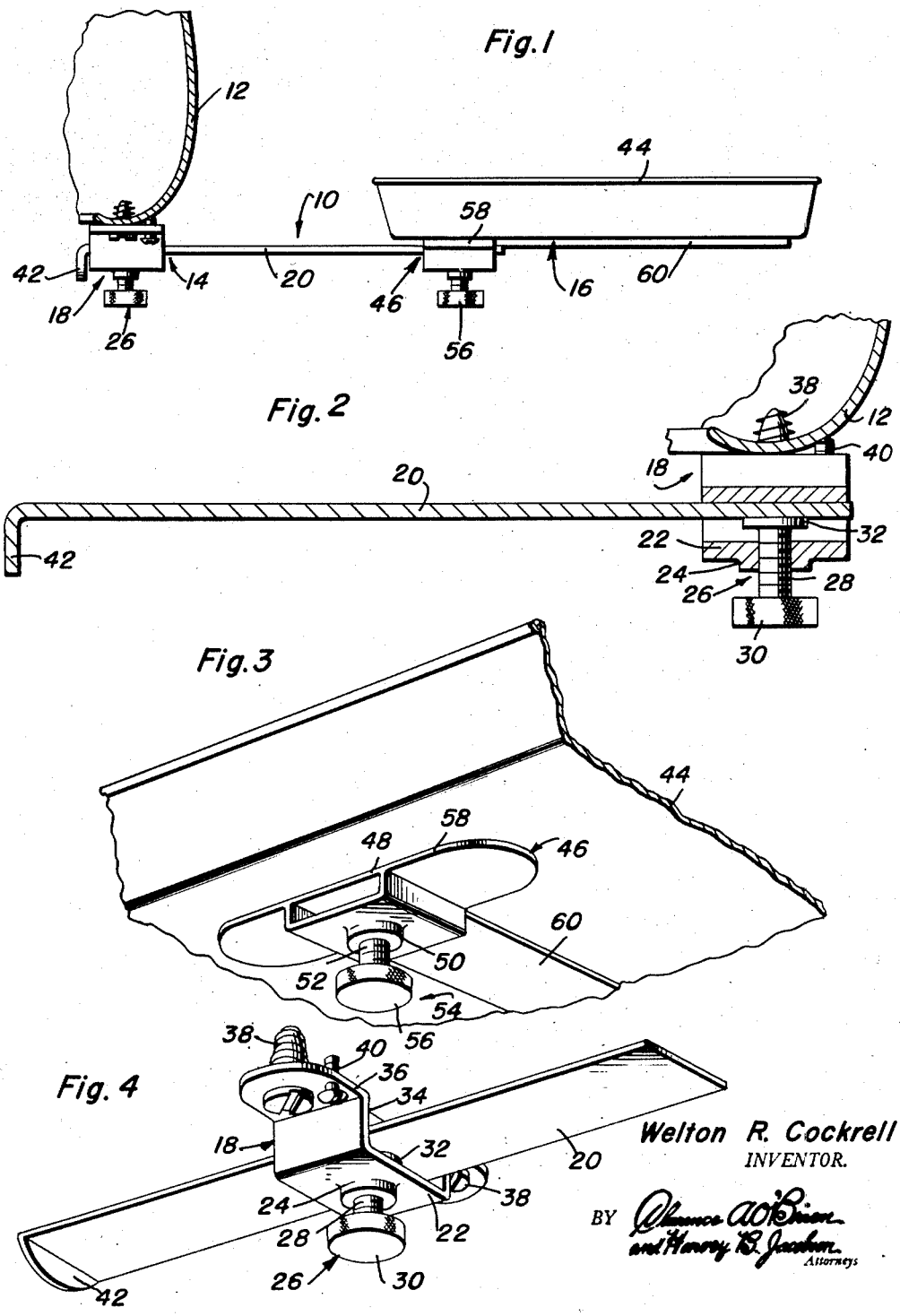
Welton R. Cockrell
INVENTOR.

Patented Feb. 9, 1954

2,668,744

UNITED STATES PATENT OFFICE 2,668,744

LEVELING BRACKET

Welton R. Cockrell, Mexia, Tex.

Application August 27, 1952, Serial No. 306,628

1 Claim. (Cl. 311—21)

This invention relates in general to trays, and more specifically to a tray adapted to be mounted on a vehicle instrument panel.

The primary object of this invention is to provide an improved service tray for supporting edibles and the like within a vehicle, said service tray being provided with means for securing the same to the instrument panel in a level position.

Another object of this invention is to provide an improved service tray adapted to be carried by a vehicle instrument panel, mounting means for said service tray permitting removal of said service tray and the retraction of a support arm therefor beneath the dash panel.

A further object of this invention is to provide an improved vehicle service tray which is adapted to be mounted on a vehicle instrument panel, said vehicle service tray being provided with suitable clamp means whereby the same may be adjustably and removably connected to the support means carried by a vehicle instrument panel.

With these objects definitely in view, this invention resides in certain novel features of construction, combination and arrangement of elements and portions as will be hereinafter described in detail in the specification, particularly pointed out in the appended claim, and illustrated in the accompanying drawings which form a material part of this application and in which:

Figure 1 is a side elevational view of the complete vehicle service tray and shows the same secured to a vehicle dash panel, the vehicle instrument panel being shown in section;

Figure 2 is an enlarged fragmentary vertical sectional view taken through support means for the service tray, the support means being shown in a retracted position;

Figure 3 is an enlarged fragmentary bottom perspective view of a tray and shows the relationship of a clamp bracket carried thereby for engagement with the support means carried by the instrument panel; and Figure 4 is an enlarged bottom perspective view of the support means carried by the instrument panel and shows the general relationship of a support arm with respect to a mounting bracket which is engageable with the instrument panel.

Similar characters of reference designate similar or identical elements and portions throughout the specification and throughout the different views of the drawings.

Referring now to the drawings in detail, it will be seen that the subject of this invention is a vehicle service tray which is referred to in general by the reference numeral 10. The vehicle service tray 10 is adapted to be mounted on and supported by a vehicle instrument panel, such as the instrument panel 12, and includes support means, which is referred to in general by the reference numeral 14, and tray means, which is referred to in general by the reference numeral 16.

Referring now to Figures 2 and 4 in particular, it will be seen that the support means includes a mounting bracket, which is referred to in general by the reference numeral 18, and a support arm 20. The mounting bracket 18 includes a rectangular cross sectional sleeve portion 22 through which the support arm 20 is passed. The bottom wall of the sleeve portion 22 is provided with a centrally located boss 24 which is internally threaded. Threadedly engaged through the boss 24 is a lock fastener 26 which includes a threaded shank portion 28 and a knob portion 30 in the lower end thereof for rotating the same. The upper end of the shank portion 28 includes a support arm engageable with enlargement 32 which engages the lower surface of the support arm 20 and clamps the same up against the upper wall of the sleeve 22.

The sleeve 22 also includes extensions 34 of its side walls, the extensions 34 terminating in outwardly directed flanges 36. Each of the flanges 36 has associated therewith a fastener 38 which is adapted to pass through an opening in the lower portion of the instrument panel 12 for securing the mounting bracket 18 thereto. Also carried by each of the flanges 36 is a leveling fastener 40 which is engageable with the underside of the instrument panel 12 for moving said support arm 20 into a horizontal plane.

When the support means 14 is not being utilized for the supporting of tray structure 16, the support arm 20 is moved to a retracted position beneath the instrument panel 12 and is secured thereto by the fastener 26. When it is desired to utilize the support arm for supporting a tray structure, the support 20 is slid through the sleeve portion 22 of the mounting clamp 18. It will be noted that the support arm 20 is provided with a depending flange 42 at the forward end thereof for engagement with the sleeve portion 22 to limit movement of the support arm 20 therethrough.

Referring now to Figures 1 and 3 in particular, it will be seen that the tray structure 16 includes a generally rectangular tray 44 which has secured to the bottom surface thereof a clamp bracket which is referred to in general by the reference numeral 46. The clamp bracket 46 also includes a rectangular cross sectional sleeve 48 which has receivable therethrough the support arm 20. In order that the support arm 20 may be adjustably clamped within the sleeve 48, the bottom wall of the sleeve 48 is provided with a centrally located depending boss 50 in which is threadedly engaged a stem portion 52 of an adjustable fastener which is referred to in general by the reference numeral 54. The adjustable fastener 54 also includes a control knob 56 and the other end thereof is provided with an enlargement (not shown) for engagement with the underside of the support arm 20 to clamp the same within the sleeve 48.

Integral with the top wall of the sleeve portion 48 is a T-shaped formation which includes a transverse bar 58 and a longitudinal bar 60. It is intended that the bars 58 and 60 be secured to the bottom of the tray 44 by suitable fastening means including soldering or welding.

When the vehicle service tray 10 is not in use, the tray construction 16 is stored beneath the seat of a vehicle or in a similar out-of-the-way position and the support arm 20 is retracted beneath the instrument panel 12. When it is desired to utilize the vehicle service tray 10, the support arm 20 is moved to the position illustrated in Figure 1 and the tray construction 16 is mounted thereon. By properly tightening down the adjustment fasteners 26 and 54, it will be seen that the tray 44 may be positioned as desired with respect to the instrument panel 12.

In view of the foregoing, it will be seen that the vehicle service tray 10 permits both the removal of a tray, such as the tray 44 from its supports to an out-of-the-way position in addition to the position of support means for a tray beneath an instrument panel.

The operation of this device will be understood from the foregoing description of the details thereof, taken in connection with the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claim.

Having described the invention, what is claimed as new is:

For use with a vehicle service tray of the type including a support arm, a mounting bracket for attaching a tray support arm to an inturned lower flange of an instrument panel, said mounting bracket including a central sleeve portion; a pair of oppositely disposed outwardly directed attaching flanges, each of said attaching flanges being provided with a fastener for securing its respective attaching flange to a lower flange of an instrument panel, a second fastener adjustably carried by each of said attaching flanges for engaging a lower flange of an instrument panel to level said sleeve portion whereby a vehicle service tray supported by said mounting bracket from an instrument panel may be leveled.

WELTON R. COCKRELL.

References Cited in the file of this patent

UNITED STATES PATENTS

| Number | Name | Date |
|---|---|---|
| 1,698,615 | Wilkins | Jan. 8, 1929 |
| 2,080,261 | Funk | May 11, 1937 |
| 2,125,476 | Westrope | Aug. 2, 1938 |
| 2,480,304 | Pelton | Aug. 30, 1949 |
| 2,549,753 | Ashman | Apr. 24, 1951 |
| 2,584,557 | Cuthbertson | Feb. 5, 1952 |
| 2,593,222 | Tracy | Apr. 15, 1952 |